United States Patent
Chen et al.

(10) Patent No.: US 8,558,798 B2
(45) Date of Patent: Oct. 15, 2013

(54) METHOD AND APPARATUS FOR ALTERING KEY FUNCTION OF SOFTWARE INPUT PANEL AND RECORDING MEDIUM THEREOF

(75) Inventors: Yu-Chuan Chen, Taoyuan County (TW); Hung-I Weng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 852 days.

(21) Appl. No.: 12/339,096

(22) Filed: Dec. 19, 2008

(65) Prior Publication Data

US 2009/0256806 A1   Oct. 15, 2009

(30) Foreign Application Priority Data

Apr. 15, 2008   (TW) ................................ 97113617 A

(51) Int. Cl.
*G06F 3/02*   (2006.01)
(52) U.S. Cl.
USPC ........................................................ 345/172
(58) Field of Classification Search
USPC .......... 345/172, 156, 168; 358/1.15; 714/157; 422/68.1
See application file for complete search history.

(56) References Cited

U.S. PATENT DOCUMENTS

| | | | |
|---|---|---|---|
| 7,167,255 B1 * | 1/2007 | Mikami et al. | 358/1.15 |
| 2007/0025877 A1 * | 2/2007 | Hansen | 422/68.1 |
| 2008/0055269 A1 | 3/2008 | Lemay et al. | |
| 2009/0027724 A1 * | 1/2009 | Nagase et al. | 358/1.15 |
| 2009/0119553 A1 * | 5/2009 | Matsushima | 714/57 |

FOREIGN PATENT DOCUMENTS

CN   1267029   9/2000

OTHER PUBLICATIONS

"1st Office Action of China Counterpart Application", issued on Apr. 13, 2010, p. 1-p. 5.
"Office Action of Taiwan Counterpart Application", issued on Sep. 16, 2011, p. 1-p. 7, in which the listed reference was cited.

* cited by examiner

*Primary Examiner* — Fred Tzeng
(74) *Attorney, Agent, or Firm* — Jianq Chyun IP Office

(57) ABSTRACT

A method and an apparatus for altering a key function of a software input panel (SIP) of an electronic device and a recording medium thereof are provided, wherein the SIP includes a plurality of keys, and the number and layout of the keys are fixed. In the present method, first, an operating interface of an electronic device is switched, wherein the operating interface includes the SIP. Then, each key of the SIP is switched to an input word corresponding to the operating interface. As a result, the input word corresponding to each key of the SIP is automatically altered according to the current operating interface, and accordingly inputting through the SIP is made very convenient.

18 Claims, 2 Drawing Sheets

METHOD AND APPARATUS FOR ALTERING KEY FUNCTION OF SOFTWARE INPUT PANEL AND RECORDING MEDIUM THEREOF

CROSS-REFERENCE TO RELATED APPLICATION

This application claims the priority benefit of Taiwan application serial no. 97113617, filed on Apr. 15, 2008. The entirety of the above-mentioned patent application is hereby incorporated by reference herein and made a part of specification.

BACKGROUND OF THE INVENTION

1. Field of the Invention

The present invention generally relates to the related applications of a software input panel (SIP), and in particular, to a method and an apparatus for altering a key function of a SIP and a recording medium thereof.

2. Description of Related Art

The term of "context awareness" is first mentioned by Schilit B. N. and Theimer M. M in 1994. According to the concept published by Schilit B. N. and Theimer M. M, context-related services are provided according to information of calculation context, user context, or physical context. In short, context awareness is a technique which allows a device to automatically detect and collect the ambiance and state of a user and accordingly meet the requirement of the user.

Presently, electronic devices integrated with context awareness technique are broadly available in the market. Taking a cell phone with a built-in calendar function as an example, if the user records a meeting schedule in the calendar in advance, whether the current time clashes with the meeting time is determined whenever a call is received and accordingly whether the user is attending the meeting is further determined. If the user is attending the meeting, the incoming call is directly connected to the voice mailbox. As a result, the purpose of automatically filtering incoming calls can be accomplished.

Besides, a mobile electronic device may have a function of automatically changing the display mode of its screen according to the current working state of the device. For example, when a user turns an upright device 90° rightward, the display of the screen is automatically changed to landscape orientation so that the user can still look at the displayed context conveniently. The techniques described above are all applications developed based on the context awareness technique.

While choosing an electronic device, whether the operation thereof is easy to learn is usually considered by the consumer besides the appearance and functions thereof. Thus, how to provide a straightforward and convenient operation pattern based on the context awareness technique has become one of the most important subjects in the development of electronic devices.

SUMMARY OF THE INVENTION

Accordingly, the present invention is directed to a method for altering a key function of a software input panel (SIP), wherein the input word corresponding to each key of the SIP is automatically altered according to a current operating interface of an electronic device, so that the input efficiency can be improved.

The present invention is directed to an apparatus for altering a key function of a SIP, wherein the input word corresponding to each key of the SIP is automatically altered according to different operating interface without changing the number and layout of the keys, so that a user can input data conveniently through the SIP.

The present invention provides a method for altering a key function of a SIP of an electronic device, wherein the SIP includes a plurality of keys with a fixed number and a fixed layout, and each of the keys is corresponding to a plurality of input words. First, an operating interface of the electronic device is switched, wherein the operating interface includes the SIP. Then, each key of the SIP is switched to an input word corresponding to the operating interface.

According to an embodiment of the present invention, the step of switching the operating interface of the electronic device may be switching an executed application program, an input field of an executed application program, a function of an executed application program, or an executed operation mode.

According to an embodiment of the present invention, the electronic device further includes a touch screen for receiving a key selecting instruction so as to select a key of the SIP. The method provided by the present invention further includes receiving the key selecting instruction so as to input the input word corresponding to the selected key at a cursor position of the electronic device after the step of switching each key of the SIP to the input word corresponding to the operating interface.

According to an embodiment of the present invention, the keys of the SIP include a space key, and the input words corresponding to the space key include at least a blank character and a domain name string, wherein the step of inputting the input word corresponding to the selected key at the cursor position further includes inputting the domain name string at the cursor position of the electronic device.

According to an embodiment of the present invention, each of the keys is corresponding to a key display area in the touch screen, wherein the key display area is used for displaying at least one input word corresponding to the key, and the surface area and the shape of the key display area are kept unchanged when the input word is displayed.

According to an embodiment of the present invention, the SIP includes a symbol table switch key for switching a symbol table, wherein the symbol table includes a plurality of input symbols. The method provided by the present invention further includes deleting those input symbols in the symbol table which are not corresponding to the operating interface after the step of switching the operating interface of the electronic device.

The present invention also provides an apparatus for altering a key function of a SIP. The apparatus includes an operating interface switch module and a key function altering module. The operating interface switch module is used for switching an operating interface of an electronic device, wherein the switched operating interface includes the SIP, the SIP has a plurality of keys with a fixed number and a fixed layout, and each of the keys is corresponding to a plurality of input words. The key function altering module is used for switching one of the keys to the input word corresponding to the operating interface.

According to an embodiment of the present invention, the operating interface switch module is used for switching an executed application program, an input field of an executed application program, a function of an executed application program, or an executed operation mode.

According to an embodiment of the present invention, the apparatus provided by the present invention further includes a touch screen for receiving a key selecting instruction, so as to select a key of the SIP.

According to an embodiment of the present invention, the apparatus provided by the present invention further includes a processing module for inputting the input word corresponding to the selected key at a cursor position of the electronic device after the touch screen receives the key selecting instruction, wherein the input word may be a character or a string.

According to an embodiment of the present invention, the keys of the SIP include a space key, and the input words corresponding to the space key include at least a blank character and a domain name string. The processing module is used for inputting the domain name string at the cursor position of the electronic device.

According to an embodiment of the present invention, the apparatus provided by the present invention further includes a SIP rendering module for rendering the SIP, displaying the SIP in the touch screen, and displaying the input word corresponding to each of the keys in the key display area of the key, wherein the SIP rendering module keeps the surface area and the shape of the key display area unchanged when it displays the input word corresponding to each of the keys.

According to an embodiment of the present invention, the SIP includes a symbol table switch key for switching a symbol table, wherein the symbol table includes a plurality of input symbols. The key function altering module is used for deleting those input symbols in the symbol table which are not corresponding to the operating interface.

The present invention further provides a recording medium for recording a computer program, wherein the computer program includes a plurality of program codes. When the computer program is loaded into an electronic device, the electronic device executes the key function altering method for a SIP as described above.

In the present invention, the input word corresponding to each of the keys of a SIP is automatically altered according to the current operating interface of an electronic device without changing the number and layout of the keys. Thereby, an input word corresponding to the operating interface is automatically input when a user presses a key of the SIP. As a result, the input efficiency through the SIP is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
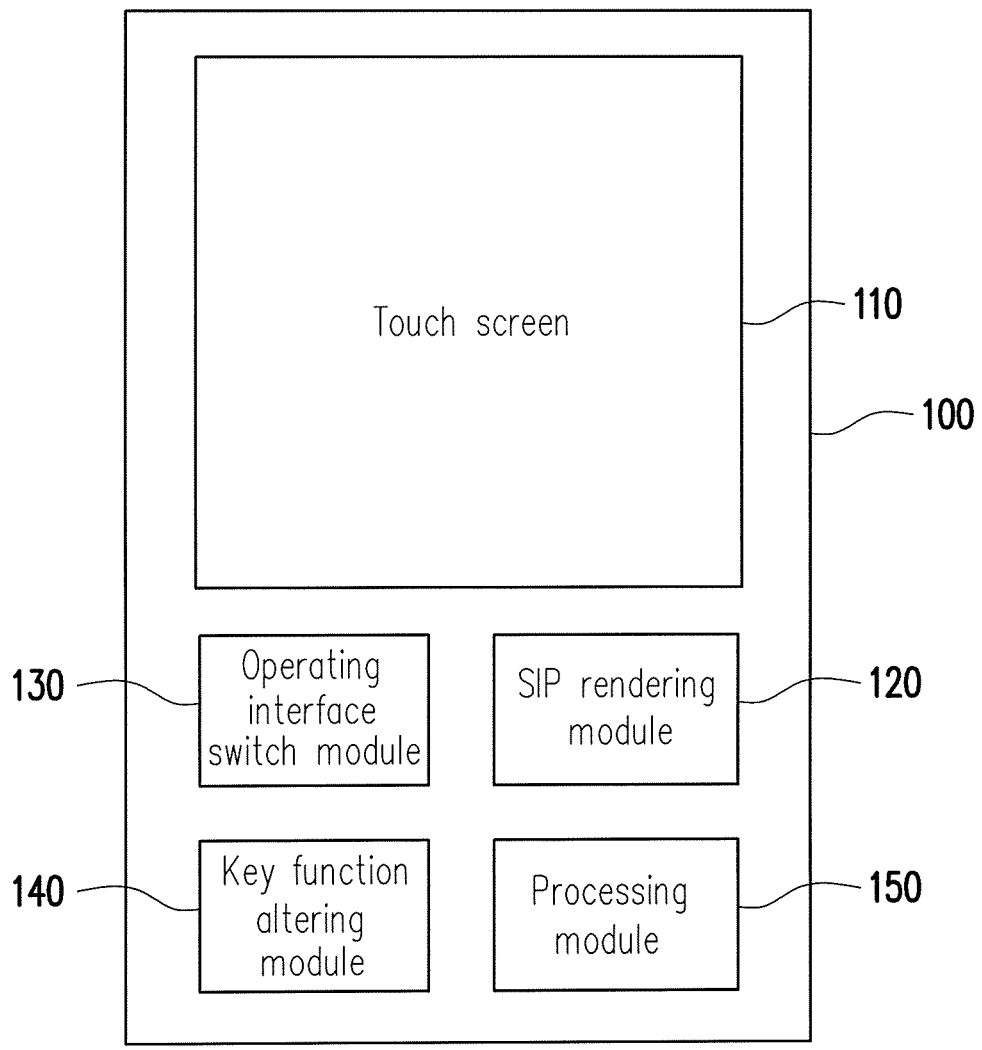
FIG. 1 is a block diagram of an apparatus for altering a key function of a software input panel (SIP) according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an apparatus for altering a key function of a software input panel (SIP) according to an embodiment of the present invention. Referring to FIG. 1, in the present embodiment, the apparatus 100 may be disposed in different electronic device, such as a cell phone, a personal digital assistant (PDA), a smartphone, or a computer, for switching an input word corresponding to each key of the SIP according to different operating interface of the electronic device.

The apparatus 100 includes a touch screen 110, a SIP rendering module 120, an operating interface switch module 130, a key function altering module 140, and a processing module 150. The touch screen 110 is used for displaying various images, and other than that, the touch screen 110 is also used for detecting an instruction generated by a touch action of a user and accordingly served as an input interface of the electronic device.

The SIP rendering module 120 is used for rendering the SIP having a plurality of keys on the touch screen 110. In the present embodiment, the SIP may be a full QWERTY keyboard, a compact QWERTY keyboard, or a phone keypad, etc. However, the present invention is not limited thereto. While rendering the SIP, the SIP rendering module 120 displays the input word corresponding to each of the keys in a key display area corresponding to the key in the touch screen 110. In other words, the word displayed in the key display area is the word inputted when the user presses the key.

In the present embodiment, each key of the SIP is corresponding to at least one input word. When a key is corresponding to multiple input words, the SIP rendering module 120 displays either all the input words or only one of the input words in the key display area; however, the number of input words displayed in the key display area is not limited in the present invention. It should be mentioned that when the SIP rendering module 120 displays the corresponding input words in the key display area, it will not change a surface area or a shape of the key display area. Accordingly, the surface area, size, and shape of the SIP can be kept unchanged, and a number and layout of the keys of the SIP are also fixed.

The operating interface switch module 130 is used for switching the operating interface of the electronic device. The switched operating interface includes the SIP having a plurality of keys. The key function altering module 140 is used for switching the key of the SIP to the input word corresponding to the current operating interface. It has to be noted herein that along with the switching of the operating interface, the key function altering module 140 switches each key of the SIP to the input word corresponding to the current operating interface. However, the number and layout of the keys of the SIP are both fixed and will not change along with the corresponding input words thereof.

When the user presses the SIP displayed in the touch screen 110 and accordingly issues a key selecting instruction corresponding to one of the keys, the processing module 150 inputs the input word corresponding to the selected key at a current cursor position of the electronic device.

Figure 2:
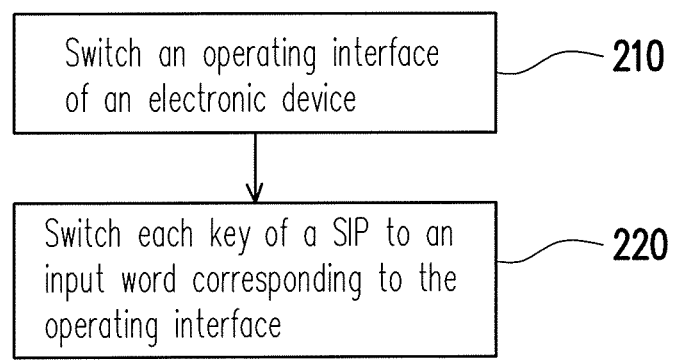
FIG. 2 is a flowchart of a method for altering a key function of a SIP according to an embodiment of the present invention.

Another embodiment of the present invention is described herein in order to further explain the operation of the apparatus 100 in detail. FIG. 2 is a flowchart of a method for altering a key function of a SIP according to an embodiment of the present invention. Referring to both FIG. 1 and FIG. 2, first, in step 210, the operating interface of the electronic device is switched by the operating interface switch module 130. The switched operating interface includes the SIP having a plurality of keys, and each key of the SIP is corresponding to at least one input word, wherein the input word may be a character or a string; however the present invention is not limited thereto.

In the present embodiment, the operation for switching the operating interface of the electronic device includes switching an executed application program or an input field of the executed application program, etc. Taking a smartphone as an example of the electronic device, turning on different application program means switching to different operating interface (for example, switching from a SMS writing application program to a webpage browsing application program). Besides, the image displayed by the webpage browsing application program contains a web address input field and a search field, and the switching between these two input fields are also considered the switching of operating interface.

Additionally, the action of switching the operating interface also includes switching an operation mode (for example, a language mode) or a function of an application program when the application program executed by the electronic device is not changed. For example, an application program with communication function also has a function for text input and message transmission, and it is also considered switching of operating interface of the electronic device when the user switches between these two functions.

After the operating interface is switched, in step 220, the key function altering module 140 switches each key of the SIP to the input word corresponding to the current operating interface. Namely, different input words are inputted along with different operating interface when the user presses the same key. The SIP rendering module 120 displays the input word corresponding to each key in the key display area of the key.

In an embodiment of the present invention, the input word corresponding to a space key of the SIP may be a blank character or a domain name string (for example, ".com", ".org", or ".tw", etc; however, the present invention is not limited thereto). Assuming that the currently executed application program is a webpage browsing application program, when the user switches the input field from a search field to a web address input field, the key function altering module 140 switches the input word corresponding to the space key to the domain name string, and the domain name string is displayed in the key display area of the space key. Accordingly, when the user presses the space key through the touch screen 110 and accordingly generates a corresponding key selecting instruction, the processing module 150 directly inputs the domain name string corresponding to the space key at the current cursor position (i.e. the web address input field).

In another embodiment of the present invention, if the space key is corresponding to more than one domain name string, then the SIP rendering module 120 displays all the domain name strings corresponding to the space key in the key display area of the space key. Thus, when the user switches the input field to the web address input field and presses the space key, the processing module 150 displays all the domain name strings corresponding to the space key at the cursor position in turn, and inputs the last displayed domain name string when the user releases the space key.

The user does not need to use any blank character while inputting a web address. Instead, domain name strings such as ".com",".org", and ".tw" are always used. Thereby, foregoing domain name strings can be quickly inputted through the method and apparatus provided by the present invention so that it is not necessary to input the characters one by one. As a result, the input efficiency is improved.

It should be stated herein that when the key function altering module 140 switches the function corresponding to a key, it will not change the number or layout of the keys, and when the SIP rendering module 120 displays the corresponding input word in the key display area of each key, it will not change the surface area or the shape of the key display area.

In another embodiment of the present invention, besides switching the input words corresponding to the keys, the key function altering module 140 also establishes a corresponding relationship between each key of the SIP and a specific instruction and switches the corresponding relationship according to different operating interface. The SIP rendering module 120 displays a hint text corresponding to the specific instruction in the key display area of each key and meanwhile, keeps the surface area and the shape of the key display area unchanged. For example, assuming that a key is corresponding to different function start instructions in different operating interfaces, when the user presses the key, the processing module 150 automatically executes a function start instruction corresponding to the current operating interface, so as to start a function corresponding to the operating interface.

In yet another embodiment of the present invention, the SIP further includes a symbol table switch key, and by pressing this key, a symbol table is switched in the touch screen 110. The symbol table includes a plurality of input symbols. The key function altering module 140 deletes those input symbols in the symbol table which are not corresponding to the current operating interface (for example, the input symbol which is not applicable to the current operation interface). For example, when the user switches the input field to the web address input field, the key function altering module 140 deletes those input symbols not applicable to the syntax of web addresses (for example, a EURO symbol) from the symbol table. By deleting those inapplicable symbols, the display space of the symbol table is saved, and at the same time, the user can find a desired symbol quickly.

It should be mentioned that the method described above for altering key functions of a SIP may be executed in any electronic device having a processor. In other words, foregoing embodiment can be designed as a computer program containing a plurality of program codes, and the computer program is recorded in a computer-readable recording medium (for example, a CD, a floppy disk, or a removable hard disk). After loading the computer program into the electronic device, foregoing method for altering key functions of the SIP can be executed in the electronic device.

As described above, the present invention provides a method and an apparatus for altering a key function of a SIP and a recording medium thereof, wherein the input word corresponding to each key of the SIP is automatically altered according to the current operating interface of an electronic device, and at the same time, the number or layout of the keys of the SIP is not changed. Accordingly, when a user switches the operating interface of the electronic device, the keys are automatically switched to characters, strings, or symbols corresponding to the current operating interface. Thus, the user can quickly input a word corresponding to the operating interface by pressing one of the keys. Thereby, the input efficiency is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for altering a key function of a software input panel (SIP) of an electronic device, wherein the SIP comprises a plurality of keys with a fixed quantity and a fixed layout, and each of the keys is corresponding to a plurality of input words, the method comprising:
- displaying a first operating interface comprising the SIP;
- altering one of the keys for inputting one or more of the corresponding input words according to the first operating interface;
- switching from the first operating interface to a second operating interface comprising the SIP, wherein the quantity and the layout of the keys within the SIP are fixed before and after switching; and
- altering one of the keys for inputting one or more of the corresponding input words according to the second operating interface.

2. The method according to claim 1, wherein the step of switching from the first operating interface to the second operating interface comprises at least one of the following steps:
- switching an executed application program;
- switching an input field of an executed application program;
- switching a function of an executed application program; and
- switching an executed operation mode.

3. The method according to claim 1, wherein the electronic device further comprises a touch screen for receiving a key selecting instruction so as to select one of the keys.

4. The method according to claim 3, wherein the keys comprise a space key and the input words corresponding to the space key comprise at least a blank character and a domain name string, after the step of altering one of the keys for inputting one or more of the corresponding input words according to the second operating interface, the method further comprises:
- receiving the key selecting instruction; and
- inputting the input word corresponding to the selected key at a cursor position of the electronic device, wherein the domain name string is inputted at the cursor position of the electronic device if the selected key is the space key.

5. The method according to claim 3, wherein each of the keys is corresponding to a key display area in the touch screen, and the key display area is used for displaying at least one input word corresponding to the key, and the method further comprises:
- keeping a surface area and a shape of the key display area unchanged when at least one input word corresponding to each of the keys is displayed.

6. The method according to claim 1, wherein the SIP comprises a symbol table switch key for switching a symbol table, wherein the symbol table comprises a plurality of input symbols, and after the step of altering one of the keys for inputting one or more of the corresponding input words according to the second operating interface, the method further comprises:
- deleting the input symbols in the symbol table not corresponding to the second operating interface.

7. An apparatus for altering a key function of a software input panel (SIP), comprising:
- an operating interface switch module, for switching an electronic device from a first operating interface comprising the SIP to a second operating interface comprising the SIP, wherein the SIP having a plurality of keys with a fixed quantity and a fixed layout, the quantity and the layout of the keys are fixed before and after switching and each of the keys is corresponding to a plurality of input words; and
- a key function altering module, for altering one of the keys for inputting one or more of the corresponding input words according to the first operating interface when the first operating interface is displayed, and for altering one of the keys for inputting one or more of the corresponding input words according to the second operating interface when the second operating interface is displayed.

8. The apparatus according to claim 7, wherein the operating interface switch module is used for switching an executed application program, switching an input field of an executed application program, switching a function of an executed application program, and switching an executed operation mode.

9. The apparatus according to claim 7 further comprising:
- a touch screen, for receiving a key selecting instruction so as to select one of the keys.

10. The apparatus according to claim 9, wherein the keys comprise a space key and the input words corresponding to the space key comprise at least a blank character and a domain name string, and the apparatus further comprising:
- a processing module, for inputting the input word corresponding to the selected key at a cursor position of the electronic device after the touch screen receives the key selecting instruction, wherein the domain name string is inputted at the cursor position of the electronic device if the selected key is the space key.

11. The apparatus according to claim 9 further comprising:
- a SIP rendering module, for displaying the SIP in the touch screen and displaying at least one input word corresponding to each of the keys in a key display area corresponding to the key, wherein a surface area and a shape of the key display area are kept unchanged when the SIP rendering module displays at least one input word corresponding to each of the keys.

12. The apparatus according to claim 7, wherein the SIP comprises a symbol table switch key for switching a symbol table, wherein the symbol table comprises a plurality of input symbols, and after switching to the second operating interface, the key function altering module is used for deleting the input symbols in the symbol table not corresponding to the second operating interface.

13. A non-transitory recording medium, for recording a computer program, wherein the computer program comprises a plurality of program codes and is loaded into an electronic device to allow the electronic device to execute a method for altering a key function of a SIP, wherein the method comprises:
- displaying a first operating interface comprising the SIP, wherein the SIP having a plurality of keys with a fixed quantity and a fixed layout, and each of the keys is corresponding to a plurality of input words;
- altering one of the keys for inputting one or more of the corresponding input words according to the first operating interface;
- switching from the first operating interface to a second operating interface comprising the SIP, wherein the quantity and the layout of the keys are fixed before and after switching; and
- altering one of the keys for inputting one or more of the corresponding input words according to the second operating interface.

14. The non-transitory recording medium according to claim 13, wherein the step of switching from the first operating interface to the second operating interface comprises at least one of the following steps:
- switching an executed application program;
- switching an input field of an executed application program;
- switching a function of an executed application program; and
- switching an executed operation mode.

15. The non-transitory recording medium according to claim 13, wherein the electronic device further comprises a touch screen for receiving a key selecting instruction so as to select one of the keys.

16. The non-transitory recording medium according to claim 15, wherein the keys comprise a space key and the input words corresponding to the space key comprise at least a blank character and a domain name string, after the step of altering one of the keys for inputting one or more of the corresponding input words according to the second operating interface, the method further comprises:

receiving the key selecting instruction; and inputting the input word corresponding to the selected key at a cursor position of the electronic device, wherein the domain name string is inputted at the cursor position of the electronic device if the selected key is the space key.

17. The non-transitory recording medium according to claim 15, wherein each of the keys is corresponding to a key display area in the touch screen, and the key display area is used for displaying at least one input word corresponding to the key, the method further comprises:

keeping a surface area and a shape of the key display area unchanged when at least one input word corresponding to each of the keys is displayed.

18. The non-transitory recording medium according to claim 13, wherein the SIP comprises a symbol table switch key for switching a symbol table, wherein the symbol table comprises a plurality of input symbols, and after the step of altering one of the keys for inputting one or more of the corresponding input words according to the second operating interface, the method further comprises:

deleting the input symbols in the symbol table not corresponding to the second operating interface.

* * * * *